United States Patent [19]
Jackson

[11] Patent Number: 5,975,311
[45] Date of Patent: Nov. 2, 1999

[54] FILTER TO BE INSERTED INTO A PIPE AND HEAT EXCHANGER EQUIPPED WITH A FILTER OF THIS KIND

[75] Inventor: Philip Jackson, Paris, France

[73] Assignee: E. Beaudrey & Cie, Paris, France

[21] Appl. No.: 09/132,742

[22] Filed: Aug. 12, 1998

[30] Foreign Application Priority Data

Aug. 13, 1997 [FR] France ................................. 97 10322

[51] Int. Cl.$^6$ ........................... B01D 33/15; B01D 33/50
[52] U.S. Cl. .................. 210/393; 210/398; 210/333.01; 210/411; 210/333.1; 165/95
[58] Field of Search ................................. 210/393, 398, 210/333.1, 333.01, 411; 165/95

[56] References Cited

U.S. PATENT DOCUMENTS

| | | |
|---|---|---|
| 2,199,709 | 5/1940 | McNeal . |
| 2,382,656 | 8/1945 | Obenshain . |
| 4,256,582 | 3/1981 | Ducasse . |
| 4,303,522 | 12/1981 | Ducasse . |
| 4,814,076 | 3/1989 | Jackson . |
| 4,844,789 | 7/1989 | Lundquist . |
| 5,141,631 | 8/1992 | Whitman . |
| 5,598,889 | 2/1997 | Jackson . |

FOREIGN PATENT DOCUMENTS

| | | |
|---|---|---|
| 2716530 | 8/1995 | France . |
| 8526836 | 1/1987 | Germany . |

*Primary Examiner*—Thomas M. Lithgow
*Attorney, Agent, or Firm*—Young & Thompson

[57] ABSTRACT

A filter includes, in a filter body, a filter unit in the general form of a wheel with, for local contraflow circulation of a cleaning fluid through its filter element, a circulation unit to which a pipe is connected. The pipe is an inlet pipe of the cleaning fluid and, on the other side of the filter unit to the circulation unit there is locally interposed in the filter body an interceptor plate, with, connected laterally to the filter body, between the filter element of the filter unit and the interceptor plate, a pipe which is an outlet pipe for the cleaning fluid. Applications include heat exchangers in which solid cleaning elements circulate, for retaining and recycling the latter.

13 Claims, 1 Drawing Sheet

FILTER TO BE INSERTED INTO A PIPE AND HEAT EXCHANGER EQUIPPED WITH A FILTER OF THIS KIND

BACKGROUND OF THE INVENTION

1. Field of the Invention

The present invention concerns filters of the kind including, in a filter body adapted to be connected to two successive sections of a pipe of any kind, a filter unit in the general form of a wheel extending transversely in the filter body, rotatable about the axis of the body and including a filter element which extends globally across the cross-section of the filter body, with, on one side of the filter unit, for local contraflow circulation of a cleaning fluid through its filter element, a circulation unit which extends along a radius of the filter unit and to which a pipe is connected.

2. Description of the Prior Art

Filters of this type have the particular advantage of a small overall axial size which enables them to be inserted, like a simple collar, into the pipe to be equipped, even in a congested environment, their filter body being then formed of a cylindrical shell with the same diameter as the pipe.

They are used to intercept debris or other solid elements of the most diverse kinds.

One of them is described in particular in U.S. patent application Ser. No. 143,634 filed Jan. 13, 1988 and granted as U.S. Pat. No. 4,814,076.

In the above U.S. patent the filter is in a pressurized pipe which in practise is an inlet pipe of the installation concerned, the latter having to be protected from debris, detritus or other solid elements conveyed by the corresponding flow.

The cleaning fluid circulation unit is disposed on the upstream side of the filter element in this disclosure and is therefore a suction unit.

The pipe to which this circulation unit is connected is thus an outlet pipe for the cleaning fluid.

Accordingly, the cleaning fluid is taken directly from the flow in which the filter element is immersed, that is to say the flow which, conveyed by the pipe concerned, passes through this filter element.

In U.S. Pat. No. 5,589,898 issued Feb. 4, 1997. it is proposed to dispose a filter of the same type on the outlet pipe of the heat exchanger in which solid cleaning elements circulate to constitute an interceptor device adapted to retain the solid cleaning elements so that they can be recycled.

The above filter then includes two circulation units disposed on respective opposite sides of the filter unit, one on the downstream side of the latter in the direction of the outgoing flow and the other on its upstream side, and are in corresponding relationship to each other, each of them being connected to a pipe, one to an inlet pipe and the other to an outlet pipe for the corresponding cleaning fluid.

In the above U.S. patent application the two circulation units employed are both horns, i.e. frustoconical troughs the cross-section of which decreases from the periphery of the filter unit to its axis.

This disposition, which avoids the need for suction, is globally satisfactory, in particular with reference to the relatively small overall axial size to which it leads in U.S. Pat. No. 4,814,076.

However, a general object of the present invention is a disposition which advantageously further reduces this overall axial size.

SUMMARY OF THE INVENTION

To be more precise, the present invention firstly consists in a filter adapted to be inserted in a pipe, of the kind including, in a filter body or body member adapted to be connected to two successive sections of the pipe concerned, a filter unit which, in the general form of a wheel, extends transversely in the filter body, and which, rotatable the axis of the latter, includes a filter element or filter panel which extends globally across the cross-section of the filter body, with, on one side of said filter unit for local contraflow or counterflow circulation of a cleaning fluid through its filter element, a circulation unit which extends along a radius of the filter unit and to which a pipe is connected, wherein the pipe connected to the circulation unit is an inlet pipe for the cleaning fluid, in line with the circulation unit, and substantially along the contour of the latter, there is locally interposed in the filter body, on the side of the filter unit opposite the circulation unit, in the immediate vicinity of the filter unit, a fixed interceptor plate, and there is laterally connected to the filter body, between the filter element of the filter unit and the interceptor plate, another pipe which is an outlet pipe for the cleaning fluid; it also consists in a heat exchanger of the kind in which solid cleaning elements circulate with, interposed on its outlet pipe, for retaining these solid cleaning elements, an interceptor device consisting of a filter of the above kind.

Accordingly, in accordance with the invention, a circulation unit, in this instance a horn, for circulating the cleaning fluid is used on only one side of the filter unit, there being on the other side of the latter merely a simple interceptor plate, the axial dimension of which, i.e. the dimension of which along the axis of the pipe, in this instance the thickness, can advantageously be very much less than that of a circulation unit.

The overall axial size of the system is advantageously reduced commensurately.

The features and advantages of the invention will emerge from the following description given by way of example with reference to the accompanying diagrammatic drawings.

DETAILED DESCRIPTION OF THE PREFERRED EMBODIMENTS

Figure 1:
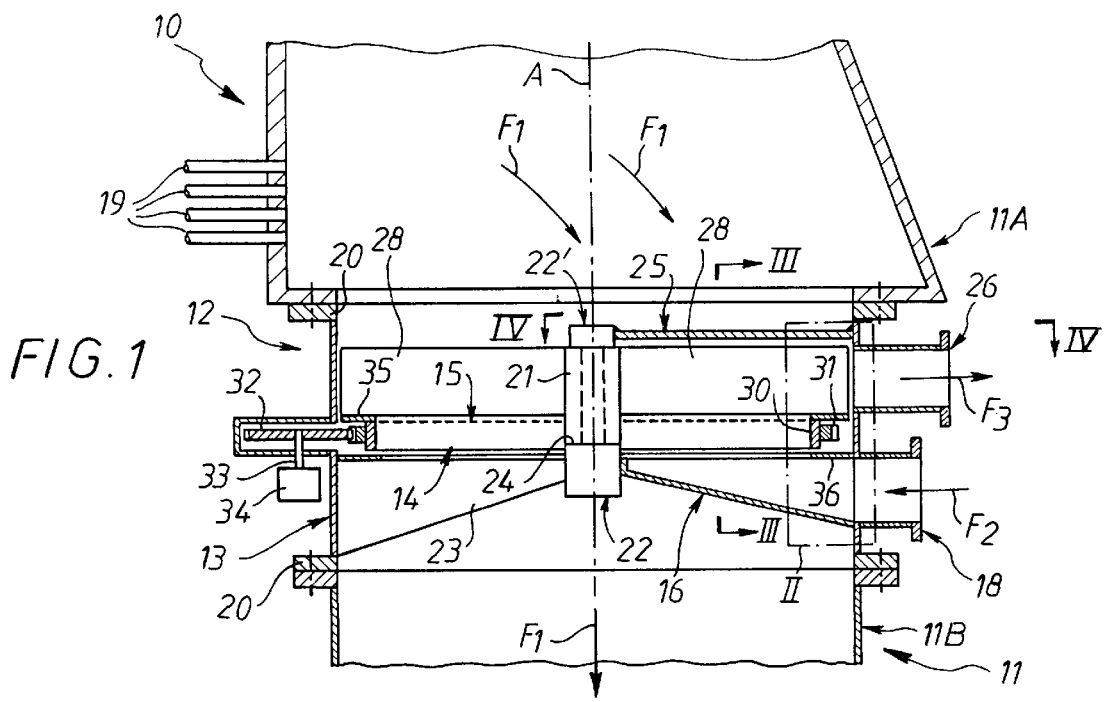
FIG. 1 is a partial elevation view in axial section of a filter in accordance with the invention shown in place in a pipe, in this instance the outlet pipe of a heat exchanger.
Figure 2:
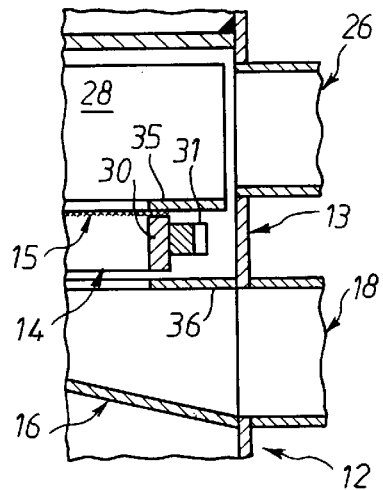
FIG. 2 reproduces to a larger scale the detail II from FIG. 1.
Figure 3:
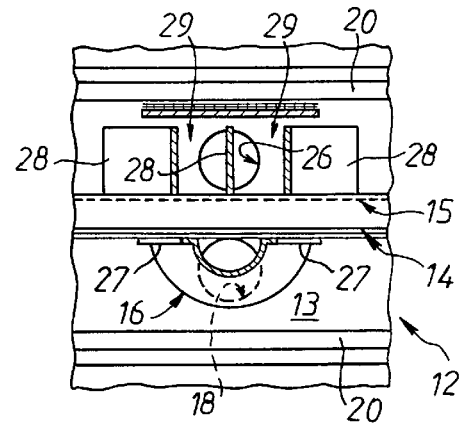
FIG. 3 is a partial view of the filter in accordance with the invention in cross-section taken along the line III—III in FIG. 1.
Figure 4:
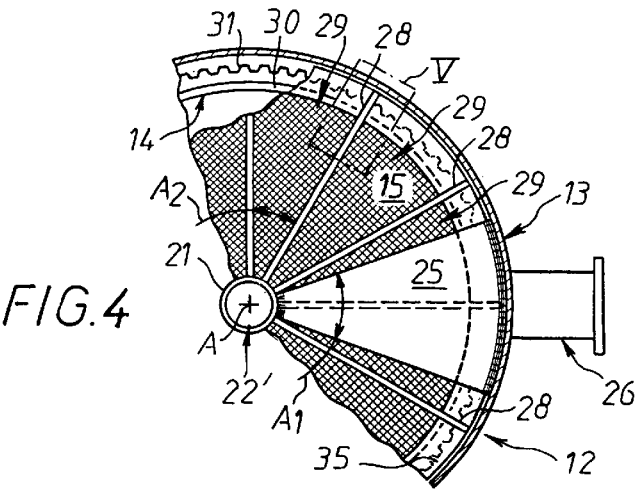
FIG. 4 is a partial plan view of it in section taken along the line IV—IV in FIG. 1.
Figure 5:
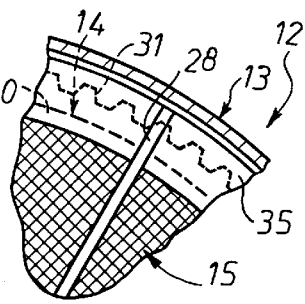
FIG. 5 reproduces to a larger scale the detail V from FIG. 4.

The figures show, by way of example, the application of the invention to a heat exchanger 10 in which solid cleaning elements, not shown, in practise foam ribber balls, circulate, as described in U.S. Pat. No. 5,598,889, and in the outlet pipe 11 of which an interceptor device consisting globally of a filter 12 is installed for retaining these solid cleaning elements in order to recycle them.

In a manner that is known in itself the filter 12 includes, in a filter body or body member 13 adapted to be connected to two successive sections 11A, 11B of the outlet pipe 11 concerned, being inserted between the latter in the manner of a collar, a filter unit 14 in the general form of a wheel which extends transversely in the filter body 13 and which, rotatable about the axis A of the latter, includes a filter element or panel 15 which extends globally across all of the cross-section of the filter body 13, with on one side of the filter unit 14, for local contraflow circulation of a cleaning fluid through its filter element 15, a circulation unit 16 which extends along a radius of the filter unit 14 and to which a pipe 18 is connected.

In the embodiment shown, the heat exchanger 10 is a tubular heat exchanger using a bundle of tubes 19 and the section 11A of its outlet pipe 11 on the downstream side of which the filter 12 is located is directly formed by the water box usually provided on the downstream side of a bundle of tubes 19 of this kind.

The relative positions of the sections 11A, 11B of the outlet pipe 11 is located and the filter 12 are specified with reference to the direction of flow in the outlet pipe 11, and the same goes for any another relative position in what follows.

This is indicated by arrows F1 in FIG. 1.

In a manner that is known in itself the filter body 13 of the filter 12 is in the form of a cylindrical shell the diameter of which is substantially equal to that of the outlet pipe 11 or, to be more precise, the section 11B of the outlet pipe 11 on whose upstream side the filter 12 is located and which in the usual way has fixing flanges 20 at its ends.

The foregoing dispositions are not relevant as such to the present invention and will not be described in more detail here.

In a manner that is known in itself, and in accordance with dispositions that in practise are well known to the skilled person, the filter unit 14 has, in its central area, a hub 21 by means of which it rotates on a fixed shaft 22, the shaft 22 being supported along the axis of the filter body 13 by support arms 23 attached to the filter body 13 which extend radially of the latter.

In the embodiment shown, the support arms 23 are downstream of the filter unit 14 in the filter body 13 and the shaft 22 is a shouldered shaft.

In other words, the shaft 22 has a transverse shoulder 24 on which the hub 21 of the filter unit 14 bears.

In accordance with the invention, the pipe 18 connected to the circulation unit 16 is an inlet pipe for the cleaning fluid, as symbolized by an arrow F2 in FIG. 1, in line with the circulation unit 16 and substantially along the contour of the latter there is locally interposed, in the filter body 13, on the side of the filter unit 14 opposite the circulation unit 16, in the immediate vicinity of the filter unit 14, a fixed interceptor plate 25 and the filter body 13 is laterally connected, between the filter element 15 of the filter unit 14 and the interceptor plate 25, to another pipe 26 which, as symbolized by the arrow F3 in FIG. 1, is an outlet pipe for the cleaning fluid.

In practise the circulation unit 16 is disposed on the downstream side of the filter unit 14 in the filter body 13, in line with the support arms 23 of the shaft 22, and, like the latter, it extends radially of the filter body 13 towards the shaft 22, preferably being fastened to the shaft 22 and to the filter body 13.

In practise the circulation unit 16 is a horn, i.e. a globally frustoconical trough the transverse section of which decreases from the filter body 13 to the hub 21 or, in other words, from the periphery of the filter unit 14 to its axis.

In the embodiment shown, the circulation unit 16 envelopes, substantially tangentially, the outlet of the pipe 18 into the filter body 13.

Be this as it may, open towards the filter unit 14 over virtually all of its length, it is blind at the end opposite the filter body 13.

In the embodiment shown, the circulation unit 16 has, along its free edges, rims 27 parallel to the filter unit 14 and therefore perpendicular to the axis A of the filter body 13 and directed in opposite directions.

The interceptor plate 25 is disposed on the upstream side of the filter unit 14 in the filter body 13.

Like the circulation unit 26, the interceptor plate 25 extends radially of the filter body 13 towards the shaft 22 and is preferably fastened to the shaft 22, or more exactly to a block 22' attached to the latter, and to the filter body 13.

In plan view, the contour of the circulation unit 16 is that of a circular sector.

This contour is therefore globally triangular.

Like the circulation unit 16, the interceptor plate 25 has a globally triangular circular sector contour in plan view. the intersector plate is defined by a substantially straight line radial generatrix.

In the embodiment shown, the filter unit 14 has spokes 28 which, projecting from the upstream side of its filter element 15, divide its interior volume into compartments 29 in line with the pipe 26 forming the cleaning fluid outlet pipe and the spokes or radial dividers 28 extend freely as far as the immediate vicinity of the filter body 13.

For example, and as shown, the spokes 28 are simple flat iron bars parallel to the axis A of the filter body 13 and attached to the hub 21, like fins.

The spokes 28 being at regular intervals, the compartments 29 defined between them are of equal size.

In plan view the contour of the compartments 29 is that of a circular sector. The height of the compartments measured between the filter element or panel 15 and the interceptor plate 25 is constant from one radial divider to the adjacent radial divider.

The angle at the center A1 of the interceptor plate 25, which is also the angle at the center of the circulation unit 16, is preferably greater than the angle at the center A2 of the compartments 29 defined in this way by the spokes 28 of the filter unit 14.

In the embodiment shown, the filter unit 14 has, on the side of its filter element 15 opposite the spokes 28, a rim 30 to which is externally attached a toothed ring 31 adapted to drive it in rotation, the toothed ring 31 meshing with a gear 32 constrained to rotate with the output shaft 33 of a motor 34 outside the filter body 13.

The rim 30 necessarily being set back relative to the filter body 13 to house the toothed ring 31, the spokes 28 extend beyond the rim 30.

In the embodiment shown, an annular flange 35 extends transversely between the spokes 28 and the rim 30, like a washer.

The filter element 25, which is a simple metal mesh, for example, is sandwiched between the annular flange 35 and the corresponding edge of the rim 30.

On the other side of the rim 30 to the annular flange 35 another transverse annular flange 36 is provided in the filter body 13, in line with the circulation unit 16 and the support arms 23, to delimit the chamber in which the toothed ring 31 operates.

Finally, in the embodiment shown, the two pipes 18, 26 for the cleaning fluid both lie on the same side of the filter body 13, each being connected to the latter substantially radially.

In service, the solid cleaning elements that circulate in the heat exchanger 10 are stopped by the filter unit 14.

At regular intervals, or continuously, the filter unit 14 is rotated by the motor 34, the latter driving the gear 32 and thus the toothed ring 31 from its output shaft 33.

The compartments 29 delimited by pairs of spokes 28 of the filter unit 14 therefore move one by one between the circulation unit 16 and the interceptor plate 25.

Each time the cleaning flow, which in accordance with dispositions of the type described in U.S. Pat. No. 5,598,889 mentioned hereinabove, can be taken off from the inlet pipe of the heat exchanger 10, extract from the corresponding compartment 29 the solid cleaning elements present in the latter, circulating locally in contraflow through said filter element 15, and channeled by the interceptor plate 24, which thus acts like a mask, it directs these solid cleaning elements into the pipe 26 forming its outlet pipe.

Of course, the present invention is not limited to the embodiment described and shown, but encompasses any variant execution thereof.

In particular, instead of being in the form of a flat disk, as particularly represented, the filter element of the filter unit employed can have any other configuration, for example slightly conical or frustoconical.

There is claimed:

1. A filter comprising a body member adapted to be mounted between successive sections of a pipe, a generally wheel-shaped filter unit accommodated in said filter element and rotatable about an axis of rotation, said filter unit including a filter panel which extends across said filter member, a circulation unit disposed on one side of said filter unit for effecting local counterflow circulation of cleaning fluid through the filter panel, said circulation unit being disposed radially of the filter unit and connected to an inlet pipe for cleaning fluid aligned with the circulation unit, said inlet pipe being generally complementary to the contour of the circulation unit, a generally flat, fixed interceptor plate being disposed on an opposite side of said filter unit relative to said circulation unit, said interceptor plate overlying and complementary at least to a sector of said filter unit, and the at least sector filter unit having a first radial side and a second radial side, said at least filter unit sector having an axial height between the filter panel and the overlying interceptor plate which is substantially constant from the first radial side of said filter unit sector to the second radial side, and an outlet pipe for cleaning fluid laterally connected to said body member and located between said filter panel and said interceptor plate.

2. The filter as claimed in claim 1, wherein said filter unit has generally radial dividers protruding from the filter panel and dividing the interior volume of the filter unit into compartments in line with the outlet pipe, said radial dividers extending freely up to the immediate vicinity of the filter body.

3. The filter as claimed in claim 2, wherein said filter unit includes a rim disposed on an opposite side of the filter panel from said radial dividers, said rim being fastened to a toothed ring for driving said filter unit in rotation.

4. The filter as claimed in claim 2, wherein said interceptor is sector-shaped plate and defines a central angle which is greater than the central angle defined by pairs of circumferentially adjacent radial dividers.

5. The filter as claimed in claim 1, wherein said circulation unit is disposed on a downstream side of said filter unit and said interceptor plate on a upstream side of said filter unit.

6. The filter as claimed in claim 1, wherein said interceptor plate is planar.

7. A filter comprising a body member adapted to be mounted between successive sections of a pipe, a generally wheel-shaped filter unit accommodated in said body member and rotatable about an axis of rotation, said filter unit including a filter panel which extends across said body member, a circulation unit disposed on one side of said filter unit for effecting local counterflow circulation of cleaning fluid through the filter panel, said circulation unit being disposed radially of the filter unit and connected to an inlet pipe for cleaning fluid aligned with the circulation unit, said inlet pipe being generally complementary to the contour of the circulation unit, a generally flat, fixed interceptor plate being disposed on an opposite side of said filter unit relative to said circulation unit, said interceptor plate being defined by a substantially straight line radial generatrix, and an outlet pipe for cleaning fluid laterally connected to said body member and located between said filter panel and said interceptor plate.

8. The filter as claimed in claim 7, wherein said filter unit has generally radial dividers protruding from the filter panel and dividing the interior volume of the filter unit into compartments in line with the outlet pipe, said radial dividers extending up to the immediate vicinity of the filter body.

9. The filter as claimed in claim 8, wherein said filter unit includes a rim disposed on an opposite side of the filter panel from said radial dividers, said rim being fastened to a toothed ring for driving said filter unit in rotation.

10. The filter as claimed in claim 8, wherein said interceptor plate is sector-shaped and defines a central angle which is greater than the central angle defined by pairs of circumferentially adjacent radial dividers.

11. The filter as claimed in claim 7, wherein said circulation unit is disposed on a downstream side of said filter unit and said interceptor plate is disposed on a upstream side of said filter unit.

12. The filter as claimed in claim 7, wherein said interceptor plate is planar.

13. A filter comprising a body member adapted to be mounted between successive sections of a pipe, a generally wheel-shaped filter unit accommodated in said body member and rotatable about an axis of rotation, said filter unit including a filter panel which extends across said body member, a circulation unit disposed on one side of said filter unit for effecting local counterflow circulation of cleaning fluid through the filter panel, said circulation unit being disposed radially of the filter unit and connected to an inlet pipe for cleaning fluid aligned with the circulation unit, said inlet pipe being generally complementary to the contour of the circulation unit, a substantially planar, fixed interceptor plate being disposed on an opposite side of said filter unit relative to said circulation unit, and an outlet pipe for cleaning fluid laterally connected to said body member and located between said filter panel and said interceptor plate.

* * * * *